(12) United States Patent
Park et al.

(10) Patent No.: US 9,821,602 B2
(45) Date of Patent: Nov. 21, 2017

(54) APPARATUS FOR TRANSFERRING DRIVING FORCE AT WHEEL FOR VEHICLE

(71) Applicants: Hyundai Motor Company, Seoul (KR); HYUNDAI WIA Corporation, Changwon-si, Gyeongsangnam-do (KR)

(72) Inventors: Jong Un Park, Seoul (KR); Soo Kyoung Lee, Gwangmyeong-si (KR)

(73) Assignees: Hyundai Motor Company, Seoul (KR); HYUNDAI WIA Corporation, Changwon-si (KR)

( * ) Notice: Subject to any disclaimer, the term of this patent is extended or adjusted under 35 U.S.C. 154(b) by 265 days.

(21) Appl. No.: 14/510,628

(22) Filed: Oct. 9, 2014

(65) Prior Publication Data
US 2015/0266340 A1 Sep. 24, 2015

(30) Foreign Application Priority Data
Mar. 18, 2014 (KR) .................. 10-2014-0031420

(51) Int. Cl.
| | |
|---|---|
| B60B 27/00 | (2006.01) |
| B60B 35/12 | (2006.01) |
| F16D 1/072 | (2006.01) |
| F16D 3/223 | (2011.01) |
| B60B 27/06 | (2006.01) |

(52) U.S. Cl.
CPC ...... *B60B 27/0042* (2013.01); *B60B 27/0047* (2013.01); *B60B 27/06* (2013.01);
(Continued)

(58) Field of Classification Search
CPC ............ B60B 27/0005; B60B 27/0042; B60B 27/0047; B60B 27/06; B60B 35/128;
(Continued)

(56) References Cited

U.S. PATENT DOCUMENTS 5,853,250 A * 12/1998 Krude ................. B60B 27/0005
384/539
6,139,216 A * 10/2000 Bertetti ............... B60B 27/0005
403/20
(Continued)

FOREIGN PATENT DOCUMENTS

| CN | 101574896 A | 11/2009 |
|---|---|---|
| JP | 2003-246203 A | 9/2003 |

(Continued)

OTHER PUBLICATIONS

"Through." Dictionary.com. [online], [retrieved on Apr. 17, 2017]. Retrieved from the Internet <URL: http://dictionary.reference.com/browse/through>.*

*Primary Examiner* — Josh Skroupa
(74) *Attorney, Agent, or Firm* — Morgan, Lewis & Bockius LLP

(57) ABSTRACT

An apparatus for transferring driving force at a wheel for a vehicle may include a housing of a constant velocity joint having a center of a first end portion formed to be penetrated and inserted into a hub bearing, and a step formed on an inner peripheral surface of a middle portion of the housing, a hub flange supporting an expansion part by the step by having one end portion coupled to a wheel side and another end portion inserted into the housing to thereby form the expansion part expanded in a radial direction, and a forming member installed in the housing to face the expansion part and having an outer peripheral surface supported by an inner peripheral surface of the housing.

5 Claims, 3 Drawing Sheets

(52) U.S. Cl.
CPC ............ B60B 35/128 (2013.01); F16D 1/072 (2013.01); B60B 27/0005 (2013.01); B60B 2900/111 (2013.01); B60B 2900/112 (2013.01); B60B 2900/113 (2013.01); B60B 2900/311 (2013.01); F16D 3/223 (2013.01); F16D 2003/22326 (2013.01); Y10T 403/4634 (2015.01); Y10T 403/4949 (2015.01)

(58) Field of Classification Search
CPC ... B60B 2900/111–2900/113; B60B 2900/311; F16D 3/16; F16D 1/072; F16D 3/223; F16D 2003/22326; Y10S 464/906; Y10T 403/4634; Y10T 403/49; Y10T 403/4949
USPC ........ 464/242, 274, 280, 178, 906; 403/178, 403/906, 242, 274, 280
See application file for complete search history.

(56) References Cited

U.S. PATENT DOCUMENTS

| | | | | |
|---|---|---|---|---|
| 6,193,419 B1 * | 2/2001 | Krude | ................ | B60B 27/0005 384/539 |
| 6,354,952 B1 * | 3/2002 | Boulton | ................. | B60B 27/00 464/145 |
| 6,851,866 B2 * | 2/2005 | Kayama | ................. | B60B 27/00 384/544 |
| 6,981,800 B2 * | 1/2006 | Shibuya | ................. | B60B 27/00 384/544 |
| 7,850,531 B2 * | 12/2010 | Brunetti | .............. | B60B 27/0005 464/178 |
| 7,896,750 B2 * | 3/2011 | Brunetti | .............. | B60B 27/0005 464/173 |
| 2002/0070506 A1 * | 6/2002 | Krude | ................... | C07H 21/04 277/391 |
| 2010/0197414 A1 * | 8/2010 | Concu | ................... | B60B 27/00 464/178 |

FOREIGN PATENT DOCUMENTS

| | | |
|---|---|---|
| JP | 2013-151223 A | 8/2013 |
| KR | 10-2005-0022565 A | 3/2005 |
| KR | 10-2008-0021736 A | 3/2008 |
| KR | 10-2010-0075377 A | 7/2010 |
| KR | 10-2013-0042981 A | 4/2013 |

* cited by examiner

APPARATUS FOR TRANSFERRING DRIVING FORCE AT WHEEL FOR VEHICLE

CROSS REFERENCE TO RELATED APPLICATION

The present application claims priority to Korean Patent Application Number 10-2014-0031420 filed Mar. 18, 2014, the entire contents of which is incorporated herein for all purposes by this reference.

BACKGROUND OF THE INVENTION

Field of the Invention

The present invention relates to an assembly structure of a drive shaft and a hub bearing, and more particularly, to an apparatus for transferring driving force at a wheel for a vehicle capable of increasing load capacity of the hub bearing by unifying a housing of a constant velocity joint and a hub flange to be coupled to each other and reinforcing stiffness of the coupled portion.

Description of Related Art

In general, a drive shaft is an apparatus for transferring power generated from a power train to a wheel, a transmission and the wheels are each provided with a joint, and particularly, a ball joint is mainly used in the wheel side to transfer the power by reflecting a bent angle upon steering.

FIG. 1 is a view for describing a configuration in which a drive shaft is assembled in the wheel side according to the related art, wherein a hub bearing 2 is provided to the wheel side, an inner race 2a of the hub bearing 2 is coupled to the wheel, a housing 1 of a constant velocity joint is inserted to penetrate through a center of the inner race 2a, and a fixing nut 3 is fastened to an end of the housing 1 protruded through the center of the inner race 2a, thereby fixing the inner race and housing in a state in which a relative rotation is restricted.

However, in the coupling structure according to the related art described above, a setting of a final preload for the bearing is completed after assembling the constant velocity joint, wherein the preload may be unevenly applied due to tightening torque of the fixing nut during a process of fastening the fixing nut, and axial force loss of the bearing may also be generated as shown by an arrow.

In addition, since the inner race and the housing are fixed to each other by using the fixing nut as described above, it is also disadvantageous in view of production cost/weight of a vehicle and productivity according to an increase in the number of parts.

In addition, since the end of the inner race and a housing portion facing the end of the inner race are fastened in a state in which they contact each other, a joint may be generated by a stick-slip phenomenon on the contacting surface.

Meanwhile, according to the related art, Korean Patent Laid-Open Publication No. 10-2005-0022565 entitled "A Wheel bearing without Shaft Washer" has been disclosed.

However, even by the above-mentioned method, since a wheel mounting flange supporting the hub bearing and the constant velocity joint housing are fastened by the fixing nut, the problems according to the related art described above caused by the fixing nut fastening method may not be solved.

The information disclosed in this Background of the Invention section is only for enhancement of understanding of the general background of the present invention and should not be taken as an acknowledgement or any form of suggestion that this information forms the prior art already known to a person skilled in the art.

BRIEF SUMMARY

Various aspects of the present invention are directed to providing an apparatus for transferring driving force at a wheel for a vehicle capable of increasing load capacity of a hub bearing by unifying a housing of a constant velocity joint and a hub flange to be coupled to each other and reinforcing stiffness of the coupled portion.

In various aspects of the present invention, an apparatus for transferring driving force at a wheel for a vehicle may include a housing of a constant velocity joint having a center of a first end portion formed to be penetrated and inserted into a hub bearing, and a step formed on an inner peripheral surface of a middle portion of the housing, a hub flange supporting an expansion part by the step by having one end portion coupled to a wheel side and another end portion inserted into the housing to thereby form the expansion part expanded in a radial direction, and a forming member installed in the housing to face the expansion part and having an outer peripheral surface supported by an inner peripheral surface of the housing.

The expansion part may be formed to be supported by a portion of a supporting surface of the step, and a second end portion of the forming member may be supported and installed by at least a portion of a remaining supporting surface except for the supporting surface of the expansion part The expansion part may be pressed by an orbital forming tool to be orbital forming-machined.

A ball for allowing a rotation and a bending motion of a driving shaft may be provided in a second end portion of the housing, and an inner groove may be formed in an inner peripheral surface of the second end portion of the housing to guide a movement of the ball, and a guide groove may be formed in a shape connected to the inner groove in an inner peripheral surface of a first end portion of the forming member.

The inner peripheral surface of the first end portion of the forming member may be formed in a shape connected to the inner peripheral surface of the second end portion of the housing, such that a shape of the connected cross section may be formed to form a curve shape.

The hub bearing may have an inner ball and an outer ball rotatably provided in a radial direction in an inner side of an outer race, the inner ball may be supported by the outer peripheral surface of the housing, and the outer ball may be supported by the outer peripheral surface of the hub flange.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
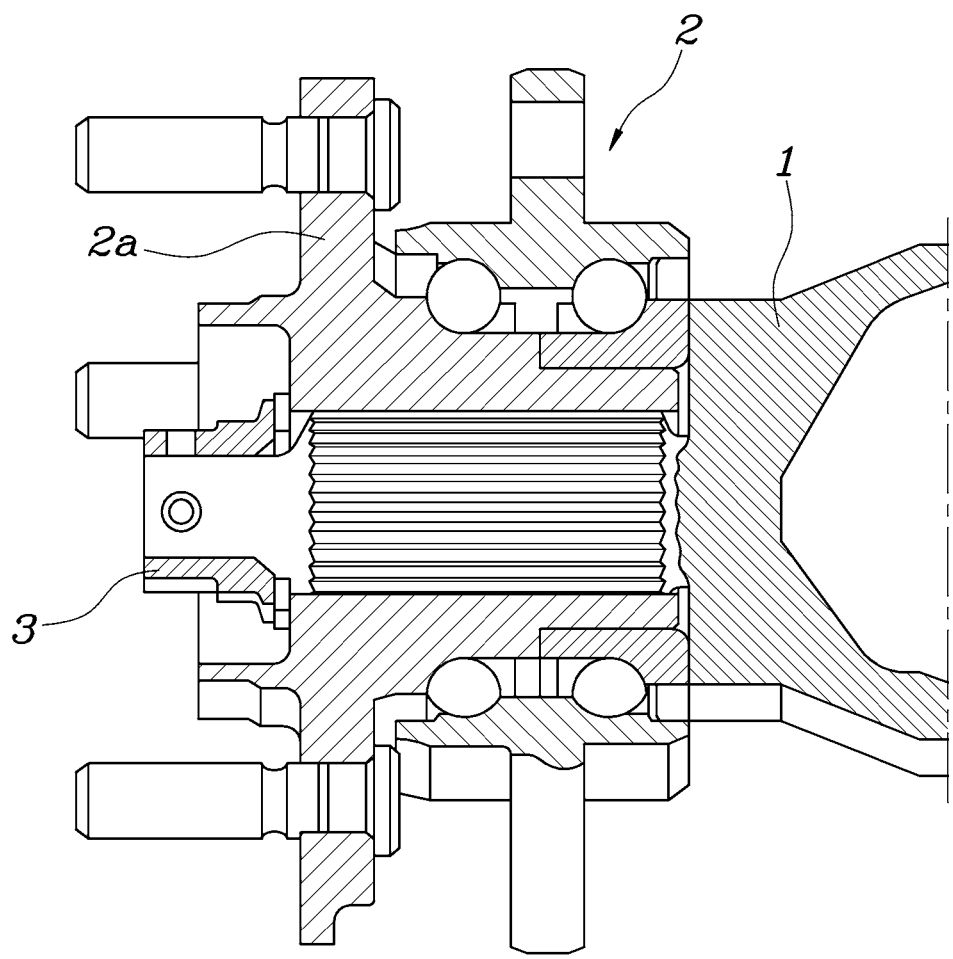
FIG. 1 is a view for describing a coupling structure of a hub bearing and a constant velocity joint according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
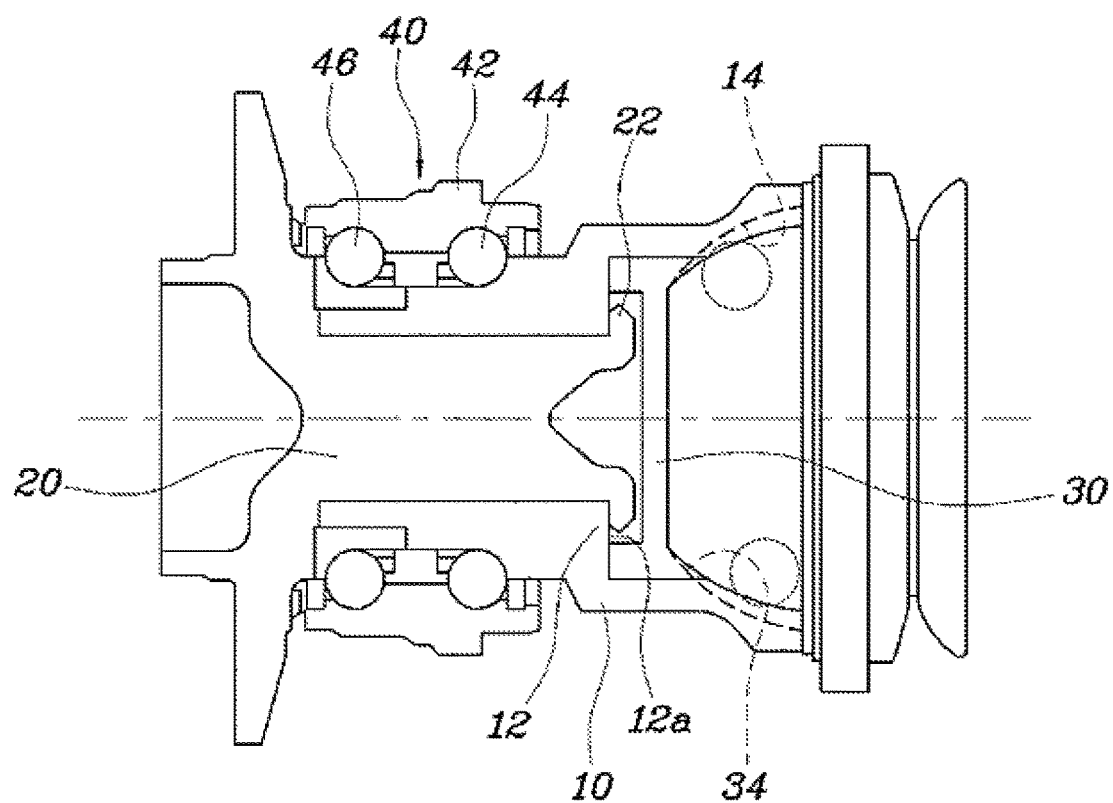
FIG. 2 is a view showing an exemplary configuration in which a drive shaft for a vehicle and a hub bearing are coupled to each other according to the present invention.
Figures 3A, 3B, 3C:
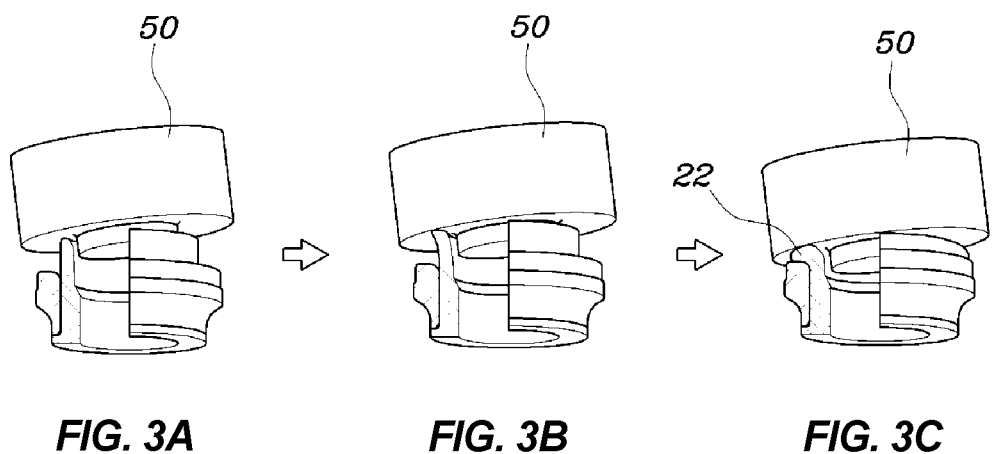
FIG. 3A, FIG. 3B, and FIG. 3C are views for describing an exemplary machining principle of an expansion part according to the present invention.

FIG. 2 is a view showing a configuration in which a drive shaft for a vehicle and a hub bearing are coupled to each other according to various embodiments of the present invention and FIG. 3 is a view for describing a machining principle of an expansion part according to various embodiments of the present invention.

An apparatus for transferring driving force at a wheel for a vehicle according to various embodiments of the present invention may generally include a housing 10, a hub flange 20, and a forming member 30.

With reference to FIG. 2, an apparatus for transferring driving force at a wheel for a vehicle according to various embodiments of the present invention may include a housing 10 of a constant velocity joint having a center of one end portion thereof formed to be penetrated and inserted into a hub bearing 40, and a step 12 is formed on an inner peripheral surface of a middle portion of the housing, a hub flange 20 configured to support an expansion part 22 by the step 12 by having one end portion coupled to a wheel side and the other end portion inserted into the housing 10 to thereby form the expansion part 22 expanded in a radial direction; and a forming member 30 installed in the housing to face the expansion part 22 and having an outer peripheral surface supported by an inner peripheral surface of the housing 10.

Additionally, a spline groove is formed at the center of one end portion of the housing 10 to penetrate therethrough and a spline is formed on the outer peripheral surface of the middle end of the hub flange 20, such that the spline formed on the hub flange 20 may be inserted into the spline groove, thereby coupling the housing 10 and the hub flange 20 to each other in a state in which relative rotations thereof are restricted to each other.

In addition, although not shown, a constant velocity joint (e.g., a Birfield-type constant-velocity joint) including a ball cage, a ball, an inner ring, a driving shaft, and the like for the purpose of a rotation and a bending motion of the driving shaft may be configured in the other end portion of the housing 10, where since the configurations of the constant velocity joint are well known, a description of a specific structure and operation principle thereof will be omitted.

According to the configuration of the present invention as described above, since the expansion part 22 formed on the end portion of the hub flange 20 is machined and formed in a form in which it is caught and supported by a step 12 portion formed on the inner peripheral surface of the housing 10, a fixing nut for coupling the housing 10 and the hub flange 20 to each other needs not to be used as in the related art. Therefore, since the fixing nut is removed, production cost and weight of a vehicle may be reduced and a preload of a bearing may be evenly distributed due to an unfastening of the fixing nut.

In addition, since a surface contact is made between the hub flange 20 and the constant velocity joint to thereby remove a portion generating a slip, a joint generated by a stick-slip phenomenon according to the related art may be prevented.

In addition, according to the present invention, the expansion part 22 may be formed to be supported by a portion of a supporting surface 12a of the step 12, and the other end portion of the forming member 30 may be supported and installed by at least a portion of the remaining supporting surface 12a except for the supporting surface 12a of the expansion part 22.

Here, the expansion part 22 may be pressed by an orbital forming tool 50 to be orbital forming-machined, as shown in FIG. 3. That is, since the expansion part 22 is formed by pressing the other end portion of the hub flange 20 by the orbital forming tool 50, while the expansion part 22 may be caught by the end portion of the hub flange 20, the hub flange 20 and the housing 10 may be coupled to each other.

Therefore, when a drive shaft is assembled into the hub bearing by the orbital forming machining, a preload setting of the hub bearing 40 may be completed, and particularly, a constant preload may be formed to thereby reduce a preload diffusion.

However, due to machining characteristics of the present invention that the expansion part 22 is formed by using the orbital forming tool 50, the expansion part 22 is formed by using the orbital forming tool 50 having a diameter smaller than a minimum inner diameter of an inner groove 14 formed on an inner surface of the housing 10, such that the expansion part 22 may be formed to have the diameter smaller than the minimum inner diameter of the inner groove 14.

In general, as a segment of the vehicle becomes large, the diameter of the expansion part also needs to be increased. However, in terms of a relationship between the hub bearing 40 and the minimum inner diameter of the inner groove of the housing in the same vehicle which is currently mass-produced, several disadvantageous problems are present in forming only the expansion part.

Additionally, due to characteristics of the orbital forming machining, in order to use the expansion part having a size capable of satisfying the load capacity of the hub bearing 40, the inner diameter of the inner groove having the size larger than the inner diameter of the inner groove of the housing which is currently used may be required. On the contrary, upon forming an expansion part matching the inner diameter of the inner groove of the housing which is currently used, since the hub bearing having a small size needs to be used, the load capacity of the bearing may not be matched to the current vehicle.

Therefore, according to the present invention, since the forming member 30 is pressed in the supporting surface 12a of the step 12 on which the expansion part 22 is not formed while unifying and assembling the hub flange 20 and the housing 10 by forming the expansion part 22, an action increasing the expansion part 22 is generated even for the housing 10 of the constant velocity joint having a relatively small size, thereby making it possible to increase the load capacity of the hub bearing 40.

Meanwhile, referring to FIG. 2, according to the present invention, a ball for allowing the rotation and the bending motion of the driving shaft may be provided in the other end portion of the housing 10, the inner groove 14 may be formed in the inner peripheral surface of the other end portion of the housing 10 to guide of a movement of the ball, and a guide groove 34 may be formed in a shape connected to the inner groove 14 in the inner peripheral surface of one end portion of the forming member 30.

In addition, the inner peripheral surface of one end portion of the forming member 30 is formed in a shape connected to the inner peripheral surface of the other end portion of the housing 10, such that a shape of the connected cross section may be formed to form a curve shape. Additionally the cross-section may be formed in any other similar shape depending on various factors.

That is, since the other end portion of the housing 10 of the constant velocity joint has an opened inner diameter smaller than the outermost diameter of the ball assembled therein, the ball cage, the ball, and the inner ring may not be simultaneously assembled.

Therefore, in order to assemble the ball in the constant velocity joint, when the ball cage and the inner ring are assembled in the housing 10 and are then bent by the maximum bent angle, a hole capable of inserting one ball may be exposed on the ball cage. The ball may be inserted through the above-mentioned hole.

As such, after the ball is inserted, the ball cage and the inner ring are aligned in a shaft direction of the housing 10 and are then maximally bent by the same method. Thereafter, the next ball is inserted.

In addition, when being maximally bent to insert the final ball, the ball in the ball cage positioned inside the housing 10 gets out of the deepest inner groove 14 of the housing 10 to thereby be positioned in the guide groove 34 formed to be extended from the inner groove 14. As a result, the final ball is inserted into the ball cage, such that the assembly of the ball may be completed.

Here, the guide groove 34 does not function under a general actuation condition of the constant velocity joint and only serves to take a ball's position upon assembling the ball, and the ball under the general actuation condition of the constant velocity joint is moved on a predetermined actuation trajectory of the inner groove 14.

Meanwhile, according to the present invention, the hub bearing 40 may have an inner ball 44 and an outer ball 46 rotatably provided in a radial direction in the inner side of the outer race 42, in which the inner ball 44 may be supported by the outer peripheral surface of the housing 10 and the outer ball 46 may be supported by the outer peripheral surface of the hub flange 20.

That is, since the outer peripheral surface of one end portion of the housing 10 and the outer peripheral surface of the hub flange 20 performs the same function as an inner race of the hub bearing 40, the inner race of the hub bearing 40 is removed, such that there is an advantage in view of the production cost and weight.

According to various embodiments of the present invention, since the expansion part formed on the end portion of the hub flange is formed in a form in which it is caught and supported by the step part formed on the inner peripheral surface of the housing, the fixing nut for coupling the housing and the hub flange to each other may not be used, such that the production cost and weight of the vehicle may be reduced and the preload of the bearing may be evenly distributed by the unfastening of the fixing nut, and the joint generated by the stick-slip phenomenon may also be prevented by removing the slip generating portion between the hub flange and the constant velocity joint.

In addition, since the forming member is pressed in the supporting surface of the step on which the expansion part is not formed while unifying and assembling the hub flange and the housing by forming the expansion part, the action increasing the expansion part is generated even for the housing of the constant velocity joint having a relatively small size, thereby making it possible to increase the load capacity of the hub bearing.

Meanwhile, although specific examples of the present invention have been described above in detail, it is obvious to those skilled in the art that various modifications and alterations may be made without departing from the spirit and scope of the present invention. In addition, it is obvious that these modifications and alterations are within the following claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for transferring driving force at a wheel for a vehicle, the apparatus comprising:
    a housing of a constant velocity joint having a center of a first end portion partially penetrating through a hub bearing as an inner race of the hub bearing, and a step formed on an inner peripheral surface of a middle portion of the housing;
    a hub flange having an expansion part supported by the step by having one end portion coupled to a wheel side and another end portion inserted into the housing to thereby form the expansion part which is expanded in a radial direction; and a forming member installed in the housing facing the expansion part and having an outer peripheral surface supported by an inner peripheral surface of the housing, wherein a ball for allowing a rotation and a bending motion of a driving shaft is provided in a second end portion of the housing, and an inner groove is formed in an inner peripheral surface of the second end portion of the housing to guide a movement of the ball, and a guide groove is formed in a shape connected to the inner groove in an inner peripheral surface of a first end portion of the forming member to guide a movement of the ball.

2. The apparatus according to claim 1, wherein the expansion part is supported by a portion of a supporting surface of the step, and a second end portion of the forming member is supported and installed by at least a portion of a remaining supporting surface except for the supporting surface of the expansion part.

3. The apparatus according to claim 2, wherein the expansion part is in an orbital shape.

4. The apparatus according to claim 1, wherein the inner peripheral surface of the first end portion of the forming member is formed in a shape connected to the inner peripheral surface of the second end portion of the housing, such that a shape of the connected cross section forms a curved shape.

5. The apparatus according to claim 1, wherein the hub bearing has an inner ball and an outer ball rotatably provided in a radial direction in an inner side of an outer race, the inner ball is supported by the outer peripheral surface of the housing, and the outer ball is supported by the outer peripheral surface of the hub flange.

* * * * *